United States Patent
Meadows

(10) Patent No.: US 7,493,679 B2
(45) Date of Patent: Feb. 24, 2009

(54) METHOD FOR FORMING A RELATIVELY THICK, LIGHTWEIGHT, NONWOVEN INSULATING MAT

(75) Inventor: Roger L. Meadows, Gretna, VA (US)

(73) Assignee: BGF Industries, Inc., Greensboro, NC (US)

( * ) Notice: Subject to any disclaimer, the term of this patent is extended or adjusted under 35 U.S.C. 154(b) by 209 days.

(21) Appl. No.: 11/414,768

(22) Filed: Apr. 28, 2006

(65) Prior Publication Data
US 2007/0254548 A1 Nov. 1, 2007

(51) Int. Cl.
D06C 23/00 (2006.01)
B32B 5/06 (2006.01)
D04H 1/46 (2006.01)

(52) U.S. Cl. ............................. 28/107; 28/111; 442/387; 442/388; 442/391; 442/402; 442/406; 442/381; 428/212; 428/213; 428/218

(58) Field of Classification Search ................. 442/387, 442/381, 383, 388, 391, 402, 406; 428/212, 428/213, 218; 28/107, 111
See application file for complete search history.

(56) References Cited

U.S. PATENT DOCUMENTS

| | | | |
|---|---|---|---|
| 3,713,931 A | 1/1973 | Lerche-Svendsen | |
| 3,993,523 A | 11/1976 | Hunt et al. | |
| 4,178,406 A * | 12/1979 | Russell | 442/391 |
| 4,442,585 A | 4/1984 | McGehee, Sr. et al. | |
| 4,500,592 A | 2/1985 | Lee et al. | |
| 4,522,876 A * | 6/1985 | Hiers | 442/388 |
| 4,700,521 A | 10/1987 | Cover | |
| 4,839,222 A | 6/1989 | Jain | |
| 4,948,649 A | 8/1990 | Hiers et al. | |
| 4,989,688 A | 2/1991 | Nelson | |
| 5,169,700 A | 12/1992 | Meier et al. | |
| 5,246,760 A | 9/1993 | Krickl | |
| 5,277,955 A | 1/1994 | Schelborn et al. | |
| 5,443,893 A | 8/1995 | Herzberg | |
| 5,503,920 A | 4/1996 | Alkire et al. | |
| 5,547,743 A * | 8/1996 | Rumiesz et al. | 442/348 |
| 5,756,405 A | 5/1998 | Appelt et al. | |
| 5,817,408 A | 10/1998 | Orimo et al. | |
| 5,883,020 A | 3/1999 | Bargo et al. | |
| 6,099,775 A | 8/2000 | Bargo et al. | |
| 6,123,172 A | 9/2000 | Bryd et al. | |
| RE37,139 E | 4/2001 | Krickl | |
| 6,296,076 B1 | 10/2001 | Hiers et al. | |
| 6,854,166 B2 * | 2/2005 | Mohammadi | 28/103 |
| 2005/0026527 A1 | 2/2005 | Schmidt et al. | |

FOREIGN PATENT DOCUMENTS

WO    WO 94/17234    *    8/1994

* cited by examiner

Primary Examiner—Norca L Torres-Velazquez
(74) Attorney, Agent, or Firm—C. Robert Rhodes; Womble Carlyle Sandridge & Rice PLLC

(57) ABSTRACT

A method is provided for forming a relatively thick, lightweight, nonwoven insulating mat. The method includes the steps of forming a relatively thin, relatively dense first outer layer by needle punching a first batt of glass fibers and forming a relatively thin, relatively dense second outer layer by needle punching a second batt of glass fibers. A relatively thicker, relatively less dense intermediate batt of glass fibers is fed between the first and second layers. Thereafter, the first layer, intermediate batt, and second layer are needle punched together to form a multi-layer mat having a first layer, middle layer, and second layer.

7 Claims, 3 Drawing Sheets

METHOD FOR FORMING A RELATIVELY THICK, LIGHTWEIGHT, NONWOVEN INSULATING MAT

FIELD OF THE INVENTION

The present invention relates to the field of insulation and thermal barriers, and, more particularly to a method for forming a multi-layer, nonwoven fiberglass insulating mat, and the mat formed therefrom.

BACKGROUND OF THE INVENTION

In recent years, needled nonwoven textile fabrics have become increasingly popular. Needled nonwovens are created by mechanically orienting and interlocking the fibers of a spunbond or carded web or batt. In particular, numerous needled or felted fabrics have been formed of either natural or synthetic fibers, or both; however, inorganic fibers such as glass fibers, are not normally suitable for felting or needling because glass fibers are quite brittle and do not lend themselves to being carded, needled, or felted. They are typically consolidated by either an air lay or wet lay process into a fabric having generally poor physical properties.

More recently, the desire to make thicker (1 inch or greater), lower weight basis, and lower density (less than about 5 pounds per cubic foot) insulating (thermal or acoustical) mats has created a renewed interest in needle punching of fiberglass fibers. In one process, e-glass fibers were opened, formed into a thick batt, and mechanically bonded on a needle loom in a single pass to form a mat. Unfortunately, these mats still have a density of 6 to 12 pounds per cubic foot.

Most recently, fiberglass fibers have been bonded together by resinous binders or thermoplastic adhesives to form thicker mats. Resinous binders, however, create undesirable problems with outgassing, and most contain either phenolic or melamine formaldehydes, which are environmentally and occupationally undesirable.

SUMMARY OF THE INVENTION

The present invention is directed to a new needle punching method for producing thicker, lightweight insulating mats from fiberglass fibers, and to an insulating mat so formed which addresses and overcomes the previous problems.

Thus, one aspect of the present invention is directed to a method for forming a thicker (greater than 1 inch), lower weight basis, and lower density (about 4 pounds per cubic foot) insulating mat.

As a first step in the process, a first loose batt of fiberglass fibers is needle punched to form a relatively thin, relatively dense first layer. In one embodiment, the fiberglass fibers are e-glass. A second layer is next similarly formed by needle punching a second loose batt of fiberglass fibers. An intermediate batt of similar fiberglass fibers is then fed between the first and second layers to form a relatively thicker and less dense middle layer. The first layer, intermediate batt, and second layer are lastly needled together in a single pass to form a three-layer (lower, middle, and upper) insulating mat. As a result, the outer layers (lower and upper) are more dense and provide the integrity and strength of the overall construction and good surface quality. The first and second layers are more dense since the fiberglass fibers forming the batts are needle punched with a large number of needle punches per square inch and with deeper penetration depth into more compact layers. The intermediate layer is less dense and substantially provides the overall thickness since the final needle punching step is performed with a much lower number of punches per square inch and much less penetration depth. Further, fewer punches per square inch in the final needle punching step are required to interlock the first and second layers to the intermediate layer.

In an exemplary embodiment, the densities of each of the lower and upper layers are substantially equal, but greater than the density of the middle layer.

Another aspect of the present invention is directed to a multi-layer nonwoven insulating mat formed in accordance with the method described herein.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

Figure 1:
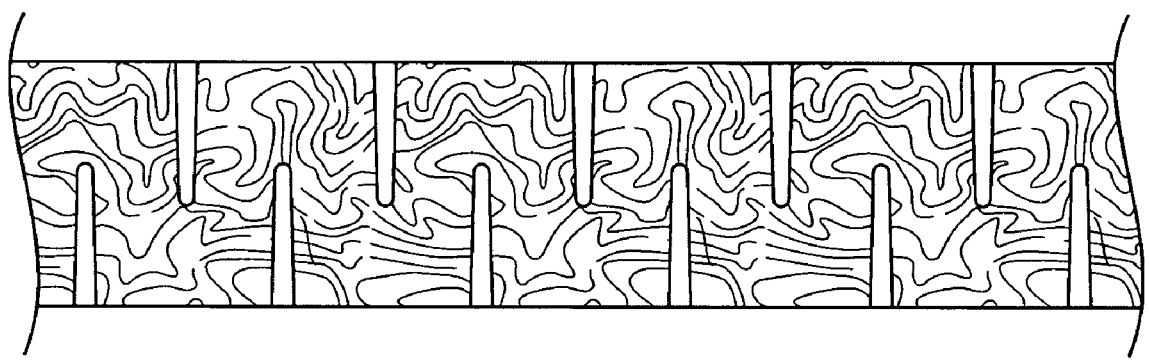
FIG. 1 is a prior art nonwoven insulating mat formed from a single thick batt of fiberglass fibers.

Referring to the Figures in general, the present invention is directed to a method for producing a multi-layer nonwoven insulating mat of fiberglass fibers, and to an insulating mat so formed.

"Needle punching" refers to the process of converting batts or webs of loose fibers into a coherent fabric, referred to as a nonwoven fabric, on a needle loom. Needle punched nonwovens are created by mechanically orienting and interlocking the fibers of a batt, as those terms are known in the art. The mechanical interlocking is achieved with a large number of barbed felting needles that repeatedly punch through a loose batt.

The generic needle punch loom comprises at least one needle board that is held in place by a needle beam. Feed rollers and exit rollers are driven to move the batt of fiberglass fibers through and out of the needle loom. A bed plate and stripper plate each have a plurality of holes (not shown) that correspond to the pattern of felting needles that are mounted on the needle board. The bed plate permits the needles to pass completely thorough the batt, while the stripper plate strips the fibers from the needles as they are retracted upwardly or downwardly so that the material can pass through the loom.

The needle loom used to practice the present invention is a Model NL9/SRS, available from Fehrer of Austria. This particular needle loom has upper and lower needle boards and stripper plates; however, other needle looms capable of providing comparable mechanical interlocking of the fiberglass fibers, as described in greater detail below, may be used.

To mechanically interlock the fibers in each fiberglass batt, a drive (not shown) moves the needle boards upwardly and downwardly with the plurality of needles mounted thereon passing through the stripping and bed plates. As those skilled in the art will appreciate, the correct "felting" needles must be selected for interlocking the fibers, without damaging or breaking, the fiberglass fibers. For the method of the present invention, 15×18×25 needles are employed, but other needle geometries may also be used.

As those skilled in the art will appreciate, the primary variables affecting the effectiveness of the needling process include the depth of penetration and the concentration and pattern of the felting needles. The greater the depth of penetration, the greater the entanglement of fibers within the batt. The greater the number/concentration of punches to the batt, the more concentrated is the entanglement pattern and the more dense is the resulting batt. The degree of entanglement is dependent upon the number of needles/punches per square inch, the rate of the batt feed to the loom, the punching frequency (upwardly and downwardly speed of the needle boards), and the number of passes of the batt through the loom. These variables will be described in greater specificity in the Examples below.

The fibers used in the exemplary embodiments described herein are created from a preferred feed stock (yarns formed from continuous fibers) that is between ECG-37 and ECG-75, but ECE-225 to ECK-18 may also be used, as those categories of material are known in the art. The feed stock is first chopped into staples having lengths of about 3 inches long; however, staples between about 2 inches and 4 inches are also suitable. In one embodiment, the fibers comprising the yarn are about 9 microns in diameter, but diameters of between 5 microns and 13 microns are suitable. E-glass staple fibers are available from several vendors such as PPG, St. Gobain, and AGY. E-glass is particularly suitable because it can withstand temperatures up to about 1,200 degrees Fahrenheit. For higher temperature applications, silica glass fibers (available from BGF Industries, Inc. of Greensboro, N.C.) may be used. Silica glass fibers can withstand temperatures up to about 2,000 degrees Fahrenheit.

Figure 2:
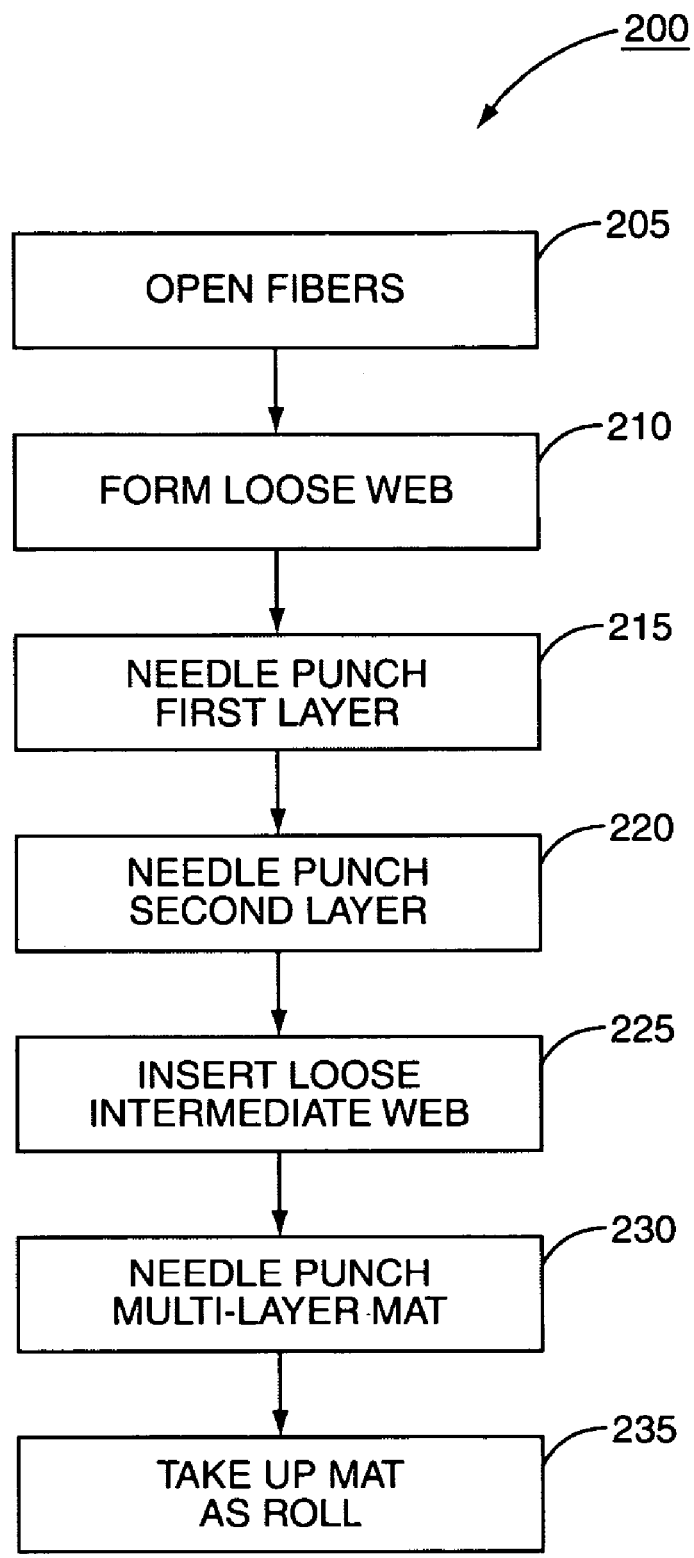
FIG. 2 is a flow diagram of the method of the present invention.
Figure 3:
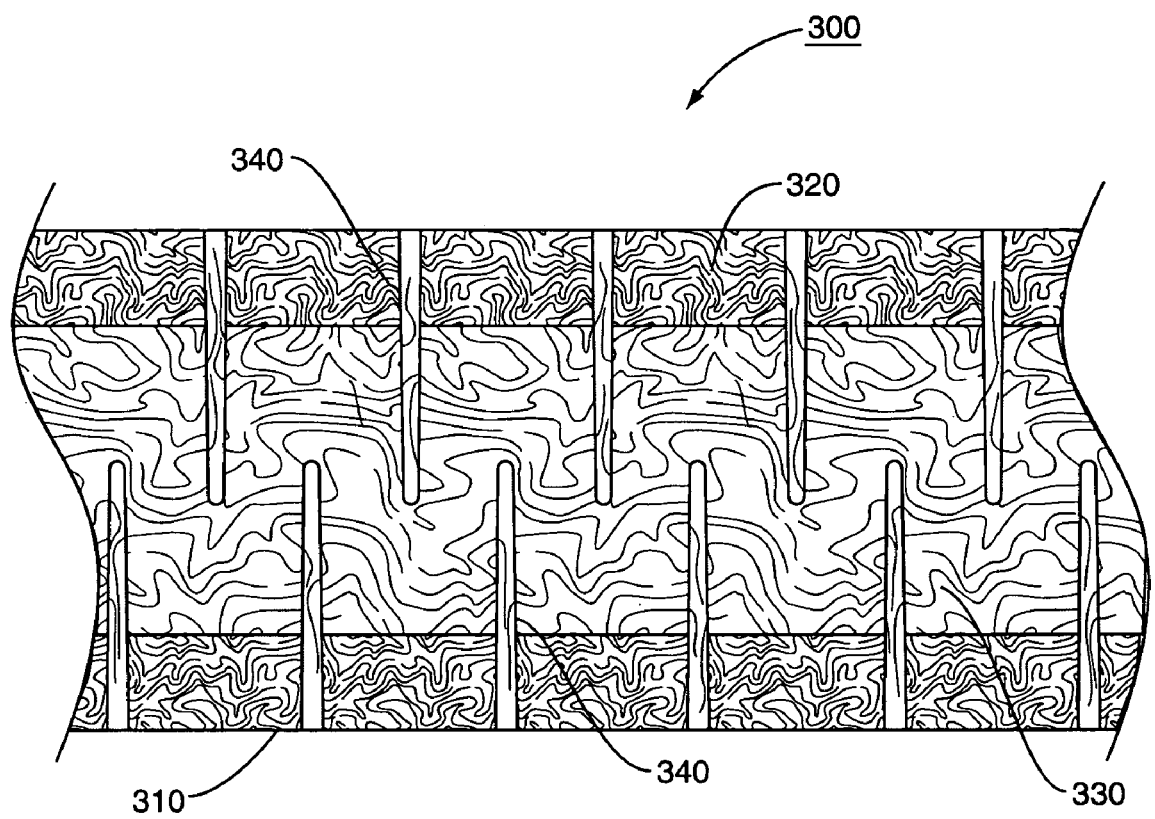
FIG. 3 illustrates one embodiment of the insulating mat formed in accordance with FIG. 2.

Turning now to FIGS. 2 and 3, a simplified flow diagram of the process 200 and product 300 of the present invention is shown. The process begins with opening (Step 205). Opening is a preliminary operation in the processing of staple fibers. Opening separates the compressed masses (bales) of fiberglass staples into loose tufts. In the embodiments described herein, a Rando Opener Blender (ROB), available from Rando Company of Rochester, N.Y. is used. The open fiberglass fibers are next formed into a loose batt (Step 210) on a Rando Webber, also available from Rando, in preparation for the needle punching operation. A feed belt is set to run at a specified speed, whereupon loose fiberglass fibers are deposited on the belt to obtain a desired thickness and density. The loose batt so formed is between approximately 2 inches and 4 inches in thickness, depending upon the desired final thickness of the finished multi-layer mat.

The loose batt is fed through the needle loom to form a first layer 310 (Step 215). The batt is fed at a speed of between about 14 feet per minute and 18 feet per minute, and desirably at a speed of about 16 feet per minute. As the batt passes beneath the needle board, the needles punch the batt at between 500 punches per square inch (PPSI) and 600 PPSI. As discussed above, and as will be appreciated by those of ordinary skill in the art, there are various feed rate and punching rate combinations that will yield a suitable puncture density.

The process for forming a second layer 320 (Step 220) is similar to the process for forming the first layer, unless a different thickness, weight basis, etc. are desired. In each of the embodiments described herein, the puncture density of the first and second layers creates denser layers, thus enhancing the integrity and tensile strength of the these layers.

Following formation of rolls of the first and second layers, rolls of the first and second layers/mats are simultaneously fed to the needle loom as the lower and upper layers, while a loose batt of opened e-glass fibers 330 between about 4 inches and 6 inches thick is inserted between the two layers (Step 225). All three layers are simultaneously needled together (Step 230) at a speed of between about 7 feet per minute and 18 feet per minute, and desirably at a speed of about 12 feet per minute with punches 340 from needles 160 at between about 150 PPSI and 250 PPSI. The finished mat is then taken up on rolls (Step 235) for further processing, storage, or shipment. The final multi-layer nonwoven mat so formed may have a width of up to about 96 inches.

Depending upon the application for which the nonwoven insulating mat is intended, e.g., water heater insulation, the final thickness and weight basis of each layer may be varied when formed in accordance with the process of the present invention. The following are exemplary embodiments for multi-layer insulating mats having total thicknesses between one inch and two inches:

EXAMPLE 1

For an insulating mat with a final thickness of about one inch, the first layer begins with a loose batt of e-glass staple fibers that is about 2 inches thick. The loose batt is subjected to needle punching with a puncture density of between about 500 PPSI and 600 PPSI to produce a relatively dense layer having a thickness of about 0.125 inches, a weight basis of about 1 ounce per square foot, and a density of about 6 pounds per cubic foot. In this embodiment, the first and second, or lower and upper, layers are formed in the same manner so that they have the same thickness, weight basis, and density, although they may be formed differently for a particular application.

Rolls of the first and second layers/mats are simultaneously fed to the needle loom as the lower and upper layers, while a loose batt of opened e-glass fibers are inserted between the two layers. This loose e-glass intermediate, or middle, layer has a thickness of about 4 inches as it is inserted between the lower and upper needled layers.

All three layers are subjected to a needling puncture density of 175 PPSI at a desired penetration as each of the first and second layers were previously penetrated. In effect, then, the lower and upper layers are each needle punched twice.

Following the needle punching of the three-layer construction, the upper and lower layers each have a thickness of approximately 0.125 inches, a weight basis of about 1.0 ounces per square foot, and a density of about 6.0 pounds per cubic foot. The intermediate layer is approximately 0.75 inches thick (approximately 6 times the thickness of each of the upper and lower layers), with a weight basis of about 3.3 ounces per square foot, and a density of about 3.3 pounds per cubic foot (approximately 55 percent of the density of each of the upper and lower layers). The resulting multi-layer insulating mat then has a combined thickness of about 1 inch, an average weight basis of about 5.3 ounces per square foot, and an average density of about 4 pounds per cubic foot.

EXAMPLE 2

For an insulating mat with a final thickness of about 1.25 inches, the first layer begins with a loose batt of e-glass fibers that is about 2.5 inches thick. The loose batt is subjected to needle punching with a puncture density of between about 500 PPSI and 600 PPSI to produce a relatively dense layer having a thickness of about 0.16 inches, a weight basis of about 1.3 ounces per square foot, and a density of about 6 pounds per cubic foot. In this embodiment, the first and second, or lower and upper, layers are formed in the same manner so that they have the same thickness, weight basis, and density, although they may be formed differently for a particular application.

Rolls of the first and second layers/mats are simultaneously fed to the needle loom as the lower and upper layers, while a loose batt of opened e-glass fibers are inserted between the two layers. This loose e-glass intermediate, or middle, layer has a thickness of about 4.5 inches as it is inserted between the lower and upper needled layers.

All three layers are subjected to a needling puncture density of 175 PPSI at a desired penetration as each of the first and second layers were previously penetrated. In effect, then, the lower and upper layers are each needle punched twice.

Following the needle punching of the three-layer construction, the upper and lower layers each have a thickness of approximately 0.16 inches, a weight basis of about 1.3 ounces per square foot, and a density of about 6.0 pounds per cubic foot. The intermediate layer is approximately 0.93 inches thick (approximately 5.8 times the thickness of each of the upper and lower layers), with a weight basis of about 4.1 ounces per square foot, and a density of about 3.3 pounds per cubic foot (approximately 55 percent of the density of each of the upper and lower layers). The resulting multi-layer insulating mat then has a combined thickness of about 1.25 inches, an average weight basis of about 6.6 ounces per square foot, and an average density of about 4 pounds per cubic foot.

EXAMPLE 3

For an insulating mat with a final thickness of about one and one-half inches, the first layer begins with a loose batt that is about 2.5 inches thick. The loose batt is subjected to needle punching with a puncture density of between about 500 PPSI and 600 PPSI to produce a relatively dense layer having a thickness of about 3/16 inch, a weight basis of about 1.5 ounces per square foot, and a density of about 6 pounds per cubic foot. In this embodiment, the first and second, or lower and upper, layers are formed in the same manner so that they have the same thickness, weight basis, and density, although they may be formed differently for a particular application.

Rolls of the first and second layers/mats are simultaneously fed to the needle loom as the lower and upper layers, while a loose batt of opened e-glass fibers are inserted between the two layers. This loose e-glass intermediate, or middle, layer has a thickness of about 5 inches as it is inserted between the lower and upper needled layers.

All three layers are subjected to a needling puncture density of 175 PPSI at a desired penetration as each of the first and second layers were previously penetrated. In effect, then, the lower and upper layers are each needle punched twice.

Following the needle punching of the three-layer construction, the upper and lower layers each have a thickness of approximately 0.19 inches, a weight basis of about 1.5 ounces per square foot, and a density of about 6 pounds per cubic foot. The intermediate layer is approximately 1.12 inches thick (approximately 5.9 times the thickness of each of the upper and lower layers), with a weight basis of about 5.0 ounces per square foot, and a density of about 3.3 pounds per cubic foot (approximately 55 percent of the density of each of the upper and lower layers). The resulting multi-layer insulating mat then has a combined thickness of about 1.5 inches, an average weight basis of about 8 ounces per square foot, and an average density of about 4 pounds per cubic foot.

EXAMPLE 4

For an insulating mat with a final thickness of about two inches, the first layer begins with a loose batt that is about 3 inches thick. The loose batt is subjected to needle punching with a puncture density of between about 500 PPSI and 600 PPSI to produce a mat having a thickness of about 0.24 inches, a weight basis of about 1.9 ounces per square foot, and a density of about 6.0 pounds per cubic foot. In this embodiment, the first and second, or lower and upper, layers are formed in the same manner so that they have the same thickness, weight basis, and density, although they may be formed differently for a particular application.

Rolls of the first and second layers/mats are simultaneously fed to the needle loom as the lower and upper layers, while a loose batt of opened e-glass fibers are inserted between the two layers. This loose e-glass intermediate, or middle, layer has a thickness of about 5.5 inches as it is inserted between the lower and upper needled layers.

All three layers are subjected to a needling puncture density of 175 PPSI at a desired penetration as each of the first and second layers were previously penetrated. In effect, then, the lower and upper layers are each needle punched twice.

Following the needle punching of the three-layer construction, the upper and lower layers each have a thickness of approximately 0.24 inches, a weight basis of about 1.9 ounces per square foot, and a density of about 6.0 pounds per cubic foot. The intermediate layer is approximately 1.52 inches thick (approximately 6.3 times the thickness of each of the upper and lower layers), with a weight basis of about 6.9 ounces per square foot, and a density of about 3.4 pounds per cubic foot (approximately 56 percent of the density of each of the upper and lower layers). The resulting multi-layer insulating mat then has a combined thickness of about 2 inches, an average weight basis of about 10.7 ounces per square foot, and an average density of about 4 pounds per cubic foot.

CONCLUSIONS

The inventors have found that a relatively thick, lightweight nonwoven insulating mat of fiberglass staple fibers can be produced by needle punching in thicknesses of about 1 inch and greater when the mat is formed as a multi-layer construction. Denser lower and upper layers are first needle punched, and a relatively looser intermediate layer is laid in between the lower and upper layers, all of which are simultaneously needle punched to obtain a stronger, smoother insulating mat. The resulting multi-layer insulating mat has a lower weight basis than could heretofore be produced with conventional processes.

Although the present invention has been described with preferred embodiments, it is to be understood that modifications and variations may be utilized without departing from the spirit and scope of the invention, as those skilled in the art will readily understand. Such modifications and variations are considered to be within the purview and scope of the appended claims and their equivalents.

I claim:

1. A method for forming a relatively thick, lightweight, needled nonwoven insulating mat of glass fibers, comprising:
   (a) forming a relatively thin, relatively dense first outer layer by needle punching a first batt of glass fibers at a prescribed needle punch density;
   (b) forming a relatively thin, relatively dense second outer layer by needle punching a second batt of glass fibers at a prescribed needle punch density;

(c) feeding a relatively thicker, relatively less dense intermediate batt of glass fibers between the first and second layers, and;

(d) needle punching the first layer, intermediate batt, and second layer together at a lesser needle punch density then in steps (a) and (b) to form a multi-layer mat having a first layer, middle layer, and second layer in which the outer layers are denser than the intermediate layer.

2. The method of claim 1 wherein the mat has a thickness of at least one inch, a density of less than 5 pounds per cubic foot, and the middle layer is at least 5 times the thickness of each outer layer and no more than 65 percent the density of each outer layer.

3. The method of claim 1 wherein the glass fibers for the first outer layer, the second outer layer, and the intermediate batt are selected from the group consisting of e-glass, silica glass, and combinations thereof.

4. The method of claim 3 wherein the glass fibers each have a length of between about 2 and 4 inches.

5. The method of claim 1 wherein the densities of the first and second layers are substantially equal.

6. The method of claim 1 wherein:
(a) each of the first, middle, and second layers are needle punched with felting needles;
(b) the first and second layers are needled punched at a needle punch density of between about 500 and 600 punches per square inch; and
(c) the first, second, and middle layers are needled punched together at a lesser needle punch density of between about 100 and 250 punches per square inch.

7. The method of claim 1 wherein the multi-layer mat has a thickness of between 1 inch and 2 inches, and a density of between about 4 pounds per cubic foot and 6 pounds per cubic foot.

* * * * *